No. 778,798. PATENTED DEC. 27, 1904.
F. A. POCOCK.
FRAME FOR ELECTRICAL MACHINES.
APPLICATION FILED OCT. 17, 1902.
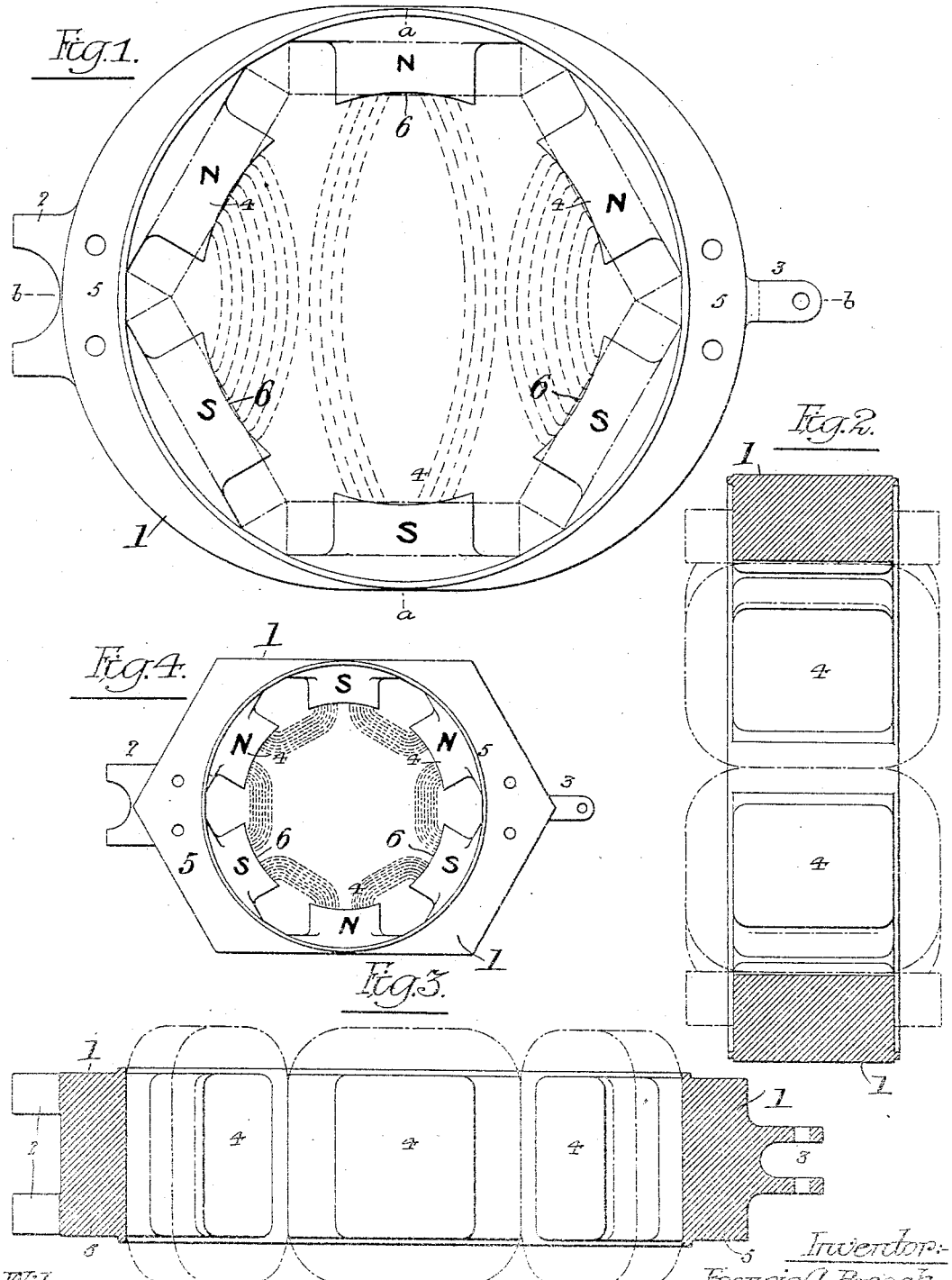

No. 778,798. Patented December 27, 1904.

UNITED STATES PATENT OFFICE.

FRANCIS A. POCOCK, OF LANSDOWNE, PENNSYLVANIA, ASSIGNOR OF THREE-EIGHTHS TO EDWARD W. PATTON, OF PHILADELPHIA, PENNSYLVANIA.

FRAME FOR ELECTRICAL MACHINES.

SPECIFICATION forming part of Letters Patent No. 778,798, dated December 27, 1904.

Application filed October 17, 1902. Serial No. 127,662.

*To all whom it may concern:*

Be it known that I, FRANCIS A. POCOCK, a citizen of the United States, and a resident of Lansdowne, Pennsylvania, have invented certain Improvements in Frames for Electrical Machines, of which the following is a specification.

My invention relates to frames for electrical machines; and it consists of a motor-frame of special construction, whereby I am enabled to dispose at certain points in said frame an excess of metal not needed when the motor is running under certain conditions, but which is required when said motor is running under other conditions.

My invention is fully set forth hereinafter, reference being had to the accompanying drawings, in which—

Figure 1 is an elevation or face view of the special form of frame forming the subject of my invention. Fig. 2 is a sectional view on the line $a\,a$, Fig. 1. Fig. 3 is a sectional view on the line $b\,b$, Fig. 1; and Fig. 4 is a modified form of frame embodying my invention.

In the accompanying drawings I have shown my improved structure as forming the frame of an electric motor having six pole-pieces, and such frame when properly wound and combined with the usual armature may be operated as a bipolar or as a multipolar machine.

In the accompanying drawings, 1 represents the frame, which may be supported in any suitable manner, connections 2 and 3 being illustrated for the purpose of applying any suitable support. The pole-pieces 4, six in number, are set equidistantly around the interior of the frame 1, each of which pole-pieces is adapted to receive a suitable field-magnet coil. (Shown in dotted lines.) Upon reference to the drawings it will be noted that an excess of metal is disposed at 5 at each end of the frame, the outer portion of such frame being in the present instance elliptical in contour.

By connecting up in various combinations the terminals of the several field-magnet coils, employing for this purpose a suitable controller, a motor having a frame of my special form may be operated as a machine with two poles or six, as desired. Thus the current can be sent through the various coils, so that they are of alternate north and south polarity with respect to the armature, or, on the other hand, the direction of the current may be changed, so that three adjacent magnets are of one polarity, while the remainder are of the opposite polarity. In other words, the connections may be such that three adjacent coils shall produce relatively to the armature each the same pole and together a common pole, as north, each of the other three poles then producing a pole opposite to the above and together a common pole of the latter polarity. In one case the machine as a whole will be bipolar, though each pole is produced by multiple coils, or the six magnets may alternate with respect to the polarities they produce to form a multipolar machine.

When being operated as a bipolar machine, certain parts of the frame are required to carry a greater number of lines of magnetic force per unit area of cross-section than others, and to effectually accommodate such excess occurring as noted I enlarge the frame at these points, as clearly shown in the drawings.

It is not essential that the exterior of the frame should be in the form of a true ellipse or that the surface of the same shall be unbroken, for I can attain the result above noted with a frame having an angular contour by thickening a portion of the walls of the same, and in Fig. 4 I have shown a frame of irregular shape, such frame being substantially hexagonal in contour. I prefer, however, to have the frame of the machine of the form shown in Fig. 1 of the drawings herewith in order to most efficiently accommodate the lines of magnetic force, and I therefore provide for the gradual addition of metal at these points to the frame, preferring that there shall be no abrupt change in the cross-sectional area of said frame.

Should it be desired to separate or break the frame in order to facilitate the insertion and removal of the armature when such frame is employed for street-car work, for instance, such separation of the frame is preferably made at the point where the mass of metal is the greatest.

The pole-pieces are intended to be wound in the usual and well-known manner, and, as in all ordinary forms of motors, their faces are concaved at 6 to agree with and accommodate the armature.

Although I have shown and described my invention as applied to the frame of an electric motor, it will be understood that it may be applied to the frames of other forms of electrical machines without departing from the scope of the same.

Having thus described my invention, I claim and desire to secure by Letters Patent—

1. In an electrical machine, a metallic frame having pole-pieces for six magnets, with coils for said pole-pieces, the metal of said frame being so disposed that its cross-section is least at two points back of a pair of oppositely-placed pole-pieces and is greatest at two other points each between a pair of adjacent pole-pieces.

2. In an electrical machine, a metallic frame having pole-pieces for six magnets, with coils for said pole-pieces, the metal of said frame being so disposed that its cross-section is least at two points back of a pair of oppositely-placed pole-pieces and is greatest at two other points each between a pair of adjacent pole-pieces and ninety degrees distant from the point of minimum section.

3. In an electrical machine, a metallic frame having pole-pieces for six magnets, with coils for said pole-pieces, the metal being so distributed that the frame is of minimum cross-section at two points back of a pair of opposite pole-pieces, said cross-section increasing with substantial uniformity on both sides of said points to two other points of maximum cross-section ninety degrees from said first points and each lying between a pair of pole-pieces projecting from the frame between the pole-pieces at the points of minimum cross-section.

4. An electrical machine having a metallic frame provided with pole-pieces, with coils for said pole-pieces, the metal of said frame being so disposed that it is of minimum area of cross-section at points adjacent to a pair of diametrically opposite pole-pieces and is of a maximum area of cross-section at other points adjacent to another pair of diametrically opposite pole-pieces.

5. An electrical machine having a metal frame provided with a series of pole-pieces and coils for said pole-pieces, the metal of said frame being so disposed that it is of minimum area of cross-section at two points back of a pair of oppositely-placed pole-pieces and is of maximum area of cross-section at other points, each between other pairs of pole-pieces.

In testimony whereof I have signed my name to this specification in the presence of two subscribing witnesses.

FRANCIS A. POCOCK.

Witnesses:
WILLIAM E. BRADLEY,
JOS. H. KLEIN.